(12) United States Patent
Tanaka

(10) Patent No.: US 6,556,328 B1
(45) Date of Patent: Apr. 29, 2003

(54) FREQUENCY STABILIZING EQUIPMENT FOR OPTICAL COMMUNICATION LIGHT SOURCE

(75) Inventor: Kazuo Tanaka, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/533,358

(22) Filed: Mar. 22, 2000

(30) Foreign Application Priority Data

Mar. 30, 1999 (JP) .......................................... 11-088459

(51) Int. Cl.$^7$ ............................................... H04B 10/04
(52) U.S. Cl. ........................ 359/187; 359/110; 359/181; 359/182; 359/188; 359/195; 372/29.011; 372/29.02; 372/29.023; 372/32
(58) Field of Search ................................. 359/110, 181, 359/182, 187, 188, 195; 372/29.011, 29.023, 32, 29.02

(56) References Cited

U.S. PATENT DOCUMENTS

| | | | | |
|---|---|---|---|---|
| 5,204,640 A | * | 4/1993 | Logan, Jr. ....................... | 331/9 |
| 5,387,992 A | * | 2/1995 | Miyazaki et al. ............ | 359/124 |
| 5,900,621 A | * | 5/1999 | Nagakubo et al. .......... | 250/205 |
| 6,151,481 A | * | 11/2000 | Wilson et al. ............. | 455/13.3 |

OTHER PUBLICATIONS

Tadashi Sakamoto et al., "Characteristics of optical senders' frequency stabilizer employing a Mach–Zehnder filter under real environment," Institute of Electronics, Information, and Comunication Engineers, B–10–216 (1977), 1 page.

* cited by examiner

Primary Examiner—Jason Chan
Assistant Examiner—Dzung Tran
(74) Attorney, Agent, or Firm—Rabin & Berdo, P.C.

(57) ABSTRACT

Improved frequency stabilizing equipment for a light source for optical communication is provided. Light from the light source is selected by a light switch. An external modulator is used to perform amplitude modulation of modulated light selected by the switch. The modulated light passed through a dispersion generator having a wavelength-dependency characteristic is mixed with a local oscillating light signal outputted from a photoelectric converter. The mixed light is converted photoelectrically by a light receiver having a non-linearity characteristic between an input light signal and output electrical signal. By using photoelectriclly converted electrical signal, a difference in phase between the light signal inputted into the dispersion generator and the output light signal of the dispersion generator and the wavelength of the modulated light outputted from the light source is controlled so that the phase difference is a predetermined reference value. Since the amplitude of the light signal received by the light receiver is substantially optically amplified by a local oscillating light signal, accuracy of controlling the wavelength is greatly improved.

12 Claims, 6 Drawing Sheets

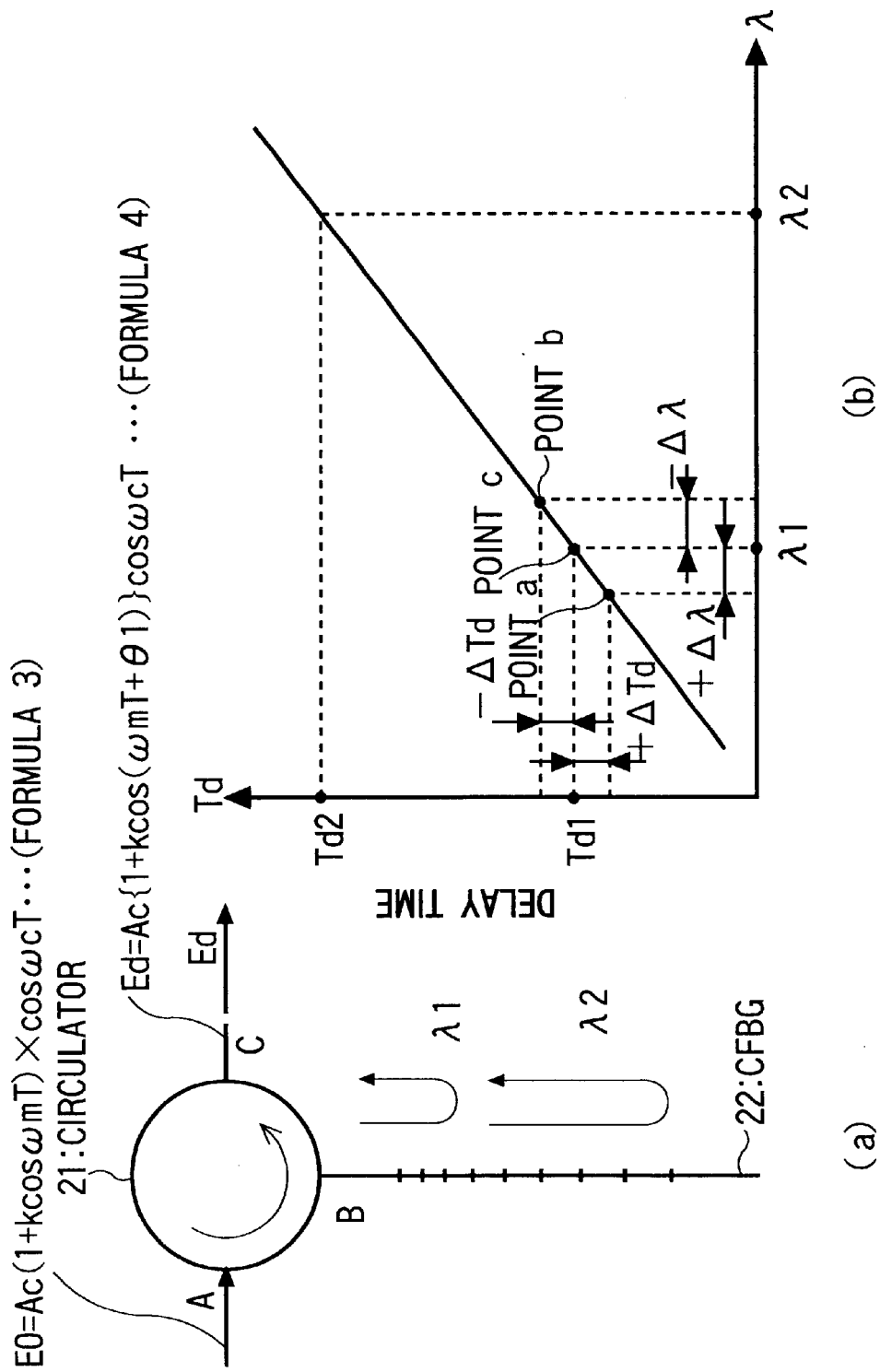

Fig.3

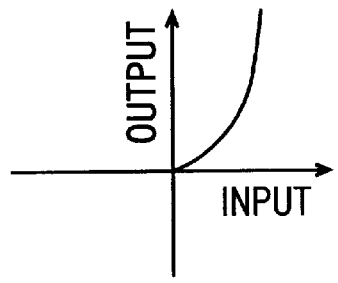

$E_d+E_e$ $(E_d+E_e)^2 = E_e^2 + 2E_dE_e + E_d^2$
(NOW, BECAUSE $E_d \ll E_e$)
$= E_e^2 + 2E_dE_e$
$\cdots$ (FORMULA 7)

$E_d = A_c\{1+k\cos(\omega_m T+\theta 1)\}\cos\omega_c T \cdots$ (FORMULA 4)
$E_e = A_e \cdot \cos\omega_e T \cdots$ (FORMULA 6)

$$\therefore E_e^2 + 2E_dE_e = \frac{1}{2}A_e^2(\cos 2\omega_e T+1)$$
$+2A_e \cdot \cos\omega_e T \cdot A_c\{1+k\cos(\omega_m T+\theta 1)\}\cos\omega_c T$ $= \frac{1}{2}A_e^2(\cos 2\omega_e T+1)$
$+A_e \cdot A_c\{1+k\cos(\omega_m T+\theta 1)\}\cos(\omega_e+\omega_c)T$
$+A_e \cdot A_c\{1+k\cos(\omega_m T+\theta 1)\}\cos(\omega_e-\omega_c)T$
$\cdots$ (FORMULA 8)

$\doteq$ DIRECT CURRENT COMPONENT $+C \cdot \cos(\omega_m T+\theta 1) \cdots$ (FORMULA 9)

FREQUENCY STABILIZING EQUIPMENT FOR OPTICAL COMMUNICATION LIGHT SOURCE

BACKGROUND OF THE INVENTION

1. Field of the Invention

The present invention relates to frequency stabilizing equipment suitably applicable to a light source used in wavelength division multiplexing (hereinafter referred to as "WDM") optical communication and more particularly to the frequency stabilizing equipment for improving accuracy and stability of a frequency of light from the light source employed in optical communication.

2. Description of the Related Art

Recently, an increase in transmission amounts is required for optical communication. To meet the requirement of increased amounts of light signal transmission, conventionally measures of space division multiplexing that can increase logarithmic values of optical fibers and of multiplexing in electric fields including frequency division multiplexing (FMD) and/or time division multiplexing (TDM) have been employed. However, since these measures cannot fully satisfy such requirements of rapid increases in transmission amounts, development of the WDM optical communication technology is being pursued in recent years. In the WDM optical communication technology, by using light from the WDM light sources having different wavelengths, a plurality of independent transmission paths can be constructed in one optical fiber, providing increased amounts of transmission for optical communication. However, to use this technology successfully, improvement of accuracy and stability in a frequency of light used as light from the WDM light source is essential.

As a means to achieve this object, an advanced technology has been proposed, for example, in a literature "Light source frequency stabilizing characteristics obtained by using a Mach-Zehnder filter in site environment" (Sakamoto and Oda: NTT, Society of Communication B-10-216, 1997). In the proposed technology, light of a plurality of WDM light source frequencies is provided so as to be fixed to peak points of light having a plurality of transmission frequencies generated by a Mach-Zehnder filter.

However, this technology has the following problems to be further solved.

1. Though it is theoretically true that, by using the Mach-Zehnder filter, both transmission frequency bands and rejection frequency bands are allowed to occur in a comb-teeth like manner at intervals of an equal frequency, when exacting specifications are required, a deviation from targeted frequency caused by production errors and/or polarization dependency and other factors may occur. Therefore, there is a possibility that a deviation occurs between the peak point of the light having a plurality of transmission frequencies and a point where the light having a plurality of light source frequencies appears.

2. It is impossible to freely select the light source frequency due to a restraint by the occurrence of comb-teeth like light waves having transmission frequencies generated by the Mach-Zehnder filter.

3. To guide light having the WDM light source frequencies to the peak point of the light waves having a plurality of transmission frequencies generated by the Mach-Zehnder filer, it is necessary to perform dithering by applying a sinusoidal power source to a heater power source of the filter (the dithering represents an operation in which the characteristic of light appearing in a comb-teeth manner induced by the Mach-Zehnder filter are changed). Therefore, there are some cases where considerations must be given to changes in temperature that may affect peripheral devices.

The present inventors have proposed a technology in U.S. Ser. No. 09/257,369 to solve these problems. In the application, frequency stabilizing equipment for a light source is disclosed which is comprised of a light source having a control circuit adapted to adjust a frequency of carrier light for optical communication, a light modulator to modulate intensity of carrier light outputted from the light source by using a marker signal, a delay generator to provide time delay to the carrier light to be modulated based on wavelengths of the carrier light modulated by the modulator, a photoelectric converter to convert the time delay given by the delay generator to an electric signal, a phase difference detector to detect the time delay in accordance with the electric signal fed by the photoelectric converter and a control signal generator to generate a control signal to be used in the control circuit in the light source based on a detection signal fed from the phase difference detector.

The control circuit in the light source employed in the frequency stabilizing equipment is adapted to control so that the carrier light from the light source has a predetermined frequency based on a phase difference between the marker signal used as a modulation signal and carrier light to be modulated to which the time delay has been provided by the delay generator and the provided time delay has been converted to the electric signal. This enables a variation in frequencies of the carrier light for optical communication to be suitably prevented without the use of the Mach-Zehnder filter. Therefore, by using the technology disclosed in the above application by the present inventors, the shortcoming described above can be solved and preferable carrier light for optical communication can be obtained without using the Mach-Zehnder filter.

SUMMARY OF THE INVENTION

In view of the above, it is an object of the present invention to provide improved frequency stabilizing equipment for a light source for optical communication.

According to a first aspect of the present invention, there is provided frequency stabilizing equipment for optical communication light source comprising:

a light source to output carrier light for optical communication, having a control circuit being able to adjust a frequency of the carrier light;

a modulator to perform light strength modulation of the carrier light outputted from the light source by using a marker signal;

a delay generator to provide time delay to the modulated carrier light depending on a wavelength of the modulated carrier light modulated by the modulator;

a photoelectric converter to convert the modulated carrier light including the time delay provided by the delay generator to an electric signal;

a phase difference detector to detect the time delay based on the electrical signal fed from the photoelectric converter;

a control signal generating device to generate a control signal used for the control circuit based on a detected signal fed from the phase difference detector in order to achieve stabilization of a frequency of the carrier light from the light source; and whereby the photoelectric converter is comprised of a local oscillating light source in order to produce a local oscillating light signal having a wavelength being different from that of the carrier light, an optical coupling device to bind the local oscillating light signal fed from the local oscillating light source to the modulated carrier light from the delay generator in order to optically amplify the modulated carrier light from the delay generator and a light receiver having a non-linearity characteristic between an input signal and output signal to receive a light signal from the coupling device and to output an electrical signal amplified non-linearly to the phase difference detector.

In the foregoing, a preferable mode is one wherein the local oscillating light source is given a feedback control to maintain a predetermined light intensity.

Also, a preferable mode is one wherein the optical coupling device is a coupler.

Also, a preferable mode is one wherein the delay generator is a dispersion generator.

Also, a preferable mode is one wherein the marker signal is a modulated signal having a predetermined angular velocity.

According to a second aspect of the present invention, there is provided frequency stabilizing equipment for optical communication light source comprising;

a light source to output carrier light for optical communication, having a control circuit being able to adjust a frequency of said carrier light;

a modulator to perform light strength modulation of the carrier light outputted from the light source by using a marker signal;

a delay generator to provide time delay to the modulated carrier light depending on a wavelength of the modulated carrier light modulated by the modulator;

a phase difference detector to detect time delay of the modulated carrier light provided by the delay generator;

a control signal generating device to generate a control signal used for the control circuit based on a detected signal fed from the phase difference detector in order to achieve stabilization of a frequency of the carrier light from the light source; and whereby the phase difference detector is comprised of a branching circuit to divide an output signal fed from the delay generator into two output signals and to provide the two output signals a difference in phase of $\pi/2$ to each other, a pair of integrating circuits to multiply the output signals outputted from the branching circuit by the marker signal respectively, a pair of low-pass filters to take out low frequency components of electrical signals fed by the integrating circuits and an arithmetic unit to take out phase difference components between the marker signal and the modulated carrier light to be fed by the delay generator by means of dividing the low frequency components obtained from one of the pair of filters by the low frequency components obtained from the other of said pair of filters.

In the foregoing, it is preferable that the arithmetic unit is used to calculate phase difference signals $\sin\theta$ or $\cos\theta$ by processing arithmetic operations using a formula:

$$F=(X_L^2+Y_L^2)^{1/2}$$

which is obtained from values of phase difference components $X_L$ and $Y_L$ and where an output signal from one filter is represented as $X_L=F\sin\theta_1$ and an output signal from the other filter is represented as $Y_L\cos\theta_1$.

Also, it is preferable that the frequency stabilizing equipment further comprises a photoelectric converter to convert the modulated carrier light provided by the delay generator into an electrical signal and to output the electrical signal to the phase difference detector, whereby the photoelectric converter is comprised of a local oscillating light source to produce a local oscillating signal having a wavelength being different from that of the carrier light, an optical coupling device to bind the local oscillating light signal fed from the local oscillating light source to the modulated carrier light from the delay generator in order to optically amplify the modulated carrier light from the delay generator and a light receiver having a non-linearity characteristic between an input signal and output signal to receive a light signal from the coupling device and to output an electrical signal amplified non-linearly to the phase difference detector.

Also, it is preferable that the local oscillating light source is given a feedback control to maintain a predetermined light intensity.

Also, it is preferable that the optical coupling device is a coupler.

Also, it is preferable that the delay generator is a dispersion generator.

Also, it is preferable that the marker signal is a modulated signal having a predetermined angular velocity.

BRIEF DESCRIPTION OF THE DRAWINGS

The above and other objects, advantages and features of the present invention will be more apparent from the following description taken in conjunction with the accompanying drawings in which:

FIG. 2(a) is a schematic block diagram showing a dispersion generator and FIG. 2(b) is a characteristic graph for the same according to the present invention;

FIG. 3 is a diagram explaining operational principles of a photoelectric converter according to the present invention;

DETAILED DESCRIPTION OF THE PREFERRED EMBODIMENTS

Best modes of carrying out the present invention will be described in further detail using various embodiments with reference to the accompanying drawings.

Before describing each of embodiments of the present invention, basic operational principles of the equipment of the present invention will be described below.

In the frequency stabilizing equipment of the present invention, amplitude modulation is performed on carrier light used for optical communication by using a marker signal used as a modulation signal having a specified angular velocity which is set arbitrarily with the use of the light modulator. The amplitude-modulated light signal is then fed to a delay generator having wavelength-dependency on delay time. The light signal outputted by the delay generator is converted to an electric signal by a photoelectric converter. The wavelength can be determined by detecting a difference in phase between the light signal inputted into this delay generator and the light signal outputted from the delay generator. The phase difference can be detected by converting the amplitude-modulated light outputted from the delay generator to an electric signal using the photoelectric converter and retrieving an envelope signal and by comparing the envelope signal with the modulated light signal.

The photoelectric converter is provided with a local oscillating light source to output a local oscillating light signal having a wavelength being different from that of the modulated light and adapted to mix the local oscillating light signal with a light signal to be converted photoelectrically. By using a light receiver adapted to have a nonlinear characteristic between inputted light signal and outputted electric signal, the mixed outputted light is converted photoelectrically. As a result, a multiplication signal between the light signal and the local oscillating light signal is produced and, by using suitably amplified division signals the phase difference can be successfully detected.

First Embodiment

Figure 1:
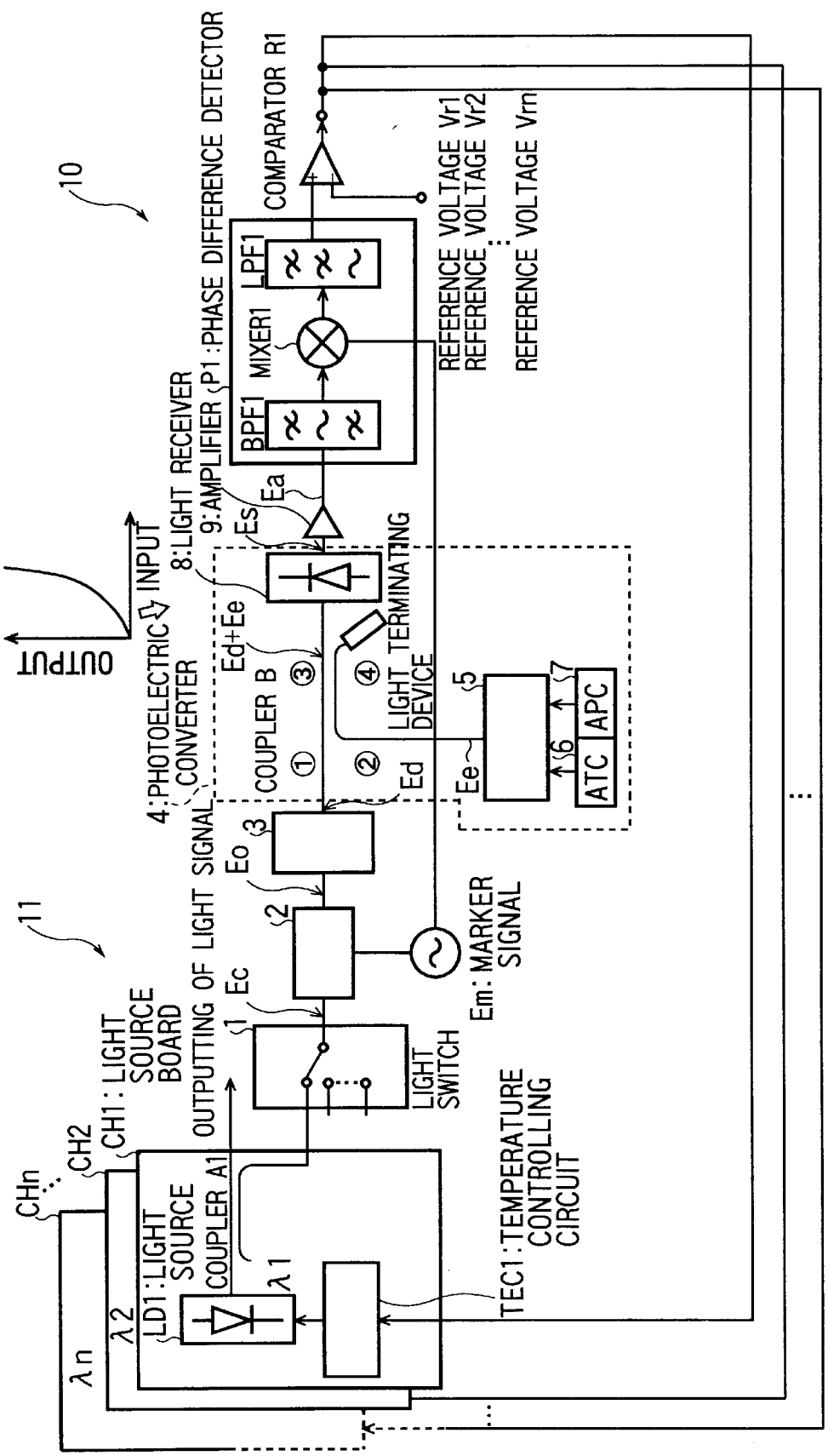
FIG. 1 is a schematic block diagram showing stabilizing equipment for a light source used in a WDM (Wavelength Division Multiplexing) optical communication according to a first embodiment of the present invention.

FIG. 1 is a schematic block diagram showing stabilizing equipment 10 for a light source device 11 used in WDM (Wavelength Division Multiplexing) optical communication. The light source device 11 for the WDM optical communication provided with stabilizing equipment 10 is comprised of n-pieces of light source boards CH1 to CHn, a light switch 1, an external modulator 2, a dispersion generator 3, a photoelectric converter 4, a phase difference detector P1 and a comparator R1.

Each of the n-pieces of the light source boards CH1 to CHn is a light signal generating section to form one communication channel. Each of the light source boards forming the communication channels is provided with a light source (any one of LD1 to LDn), a temperature controlling circuit (any one of TEC1 to TECn) and a coupler (any one of A1 to An). Each of the light sources (any one of LD1 to LDn) is composed of a laser diode adapted to oscillate light at wavelengths of $\lambda$ ($\lambda_1$ to $\lambda_n$). Each of the light sources is operative to output carrier light, i.e., modulated light to be used for optical communication having its own wavelength. The temperature controlling circuit (TEC1 to TECn) is a section used to change oscillation frequency of the light source (LD1 to LDn) by a control signal (which is described later in detail).

The coupler (A1 to An) is a section used to separate a part of the modulated light Ec for every channel and to take it out. The light switch 1 is a switch used to select one channel out of n-pieces of channels formed by the n-pieces of light source boards (CH1 to CHn).

The external modulator 2 is a section used to receive a part of modulated light Ec transmitted through the channel formed by the n-pieces of the light source boards (CH1 to CHn) and to perform amplitude-modulation on the modulated light Ec by using a marker signal Em having a predetermined angular velocity which is arbitrarily set in advance. It is composed of, for example, single crystal of lithium niobate or the like.

The dispersion generator 3 receives the amplitude-modulated light signal Eo from the external modulator 2 and performs dispersion of its wavelength by using, for example, a chirped fiber black grating (hereafter referred to as a "CFBG").

The photoelectric converter 4 receives the wavelength-dispersed light signal Ed and mixes it with the local oscillating light signal Ee having a wavelength being different from that of the above modulated light Ec. A photoelectric conversion is performed on the mixed light signals Ed+Ee by using a light receiver 8 which shows a non-linearity characteristic between an input light signal and an output electric signal. As a result, a multiplication signal Es is produced which is obtained by multiplying the local oscillating light signal Ee by the wavelength-dispersed light signal Ed. The photoelectric converter 4 is comprised of a coupler B, a local oscillating light source 5, a temperature adjusting circuit 6, an output power adjusting circuit 7 and a light receiver 8.

The coupler B is operative to mix the wavelength-dispersed light signal fed from the above dispersion generator 3 with the local oscillating light signal Ee described later in detail.

The local oscillating light source 5 is a light source used to output the local oscillating light signal Ee having a wavelength being different from that of the said modulated light Ec. As this light source, a laser diode being capable of monitoring backlight using a photodiode is ordinarily used. The temperature adjusting circuit 6 and the output power adjusting circuit 7 are circuits used for compensating changes caused by an output from the local oscillating light source 5.

The light receiver 8 is a photodiode which shows a non-linearity characteristic between an input light signal and an output electric signal. The light receiver 8 is operative to receive the signal Ed+Ee obtained by mixing the wavelength-dispersed light signal Ed with the local oscillating light signal Ee and to perform photoelectric conversion on it and to produce the multiplication signal Es obtained by multiplying the local oscillating signal Ee by the dispersed light signal Ed. The principle on which the multiplication signal Es is produced will be described later in detail.

The amplifier 9 is operative to amplify the electric signal converted by the photoelectric converter 4.

The phase difference detector P is a section used to obtain a control signal to stabilize an oscillation frequency of the light from the light sources (LD1 to LDn) for every channel. It is further provided with a band-pass filter BPF1, a mixer MIX1 and a low-pass filter LPF1.

The band-pass filter BPF1 is a filter used to extract only the above multiplication signal Es. The mixer MIX1 is a section used to mix an output from the band-pass filter BPF1 with a marker signal Em used as the modulated signal at the above external modulator 2 (in other words, to multiply the former by the latter). The low-pass filter LPF1 is a section used to receive a component with doubled angular velocity and direct current components, which are outputted from the mixer MIX1, and to allow the direct current only to pass. The comparator R is a section used to receive an output from the low-pass filter LPF1 to compare the output with a reference voltage predetermined for every channel. The result from the comparison is fed back to each of the temperature controlling circuits (TEC1 to TECn) of each channel to be used as a control signal.

As shown in FIG. 1, n-pieces of light sources (LD1 to LDn) are adapted to oscillate the modulated wave light each having its own wavelength ($\lambda_1$ to $\lambda_n$) for every channel. A part of the modulated wave light is separated by the coupler (CPL1 to CPLn) and is sent to a light switch 1. The light switch is used to select the modulated light Ec for one channel and to send it out to the external modulator 2.

The following description of operations will be made presuming that CH1 is used as the light source board. The external modulator 2 is adapted to perform amplitude modulation on the modulated wave light from the light source board CH1 by using a modulation signal (hereafter referred to as a marker signal Em) and to transmit the amplitude-modulated light signal Eo to the dispersion generator 3. The dispersion generator 3 is used to generate a time delay in the amplitude-modulated light signal Eo depending on the wavelength.

The modulated light Ec and the marker signal Em are given by the following formulas:

$$Ec=Ac\cdot COS\ \omega cT \quad (1)$$

$$Em=Am\cdot COS\ \omega mT \quad (2)$$

The amplitude-modulated light signal Eo is represented by the above formulas (1) and (2) as below:

$$Eo=Ac(1+K\cdot COS\ \omega cT)COS\ \omega cT \quad (3)$$

where, Ac is an amplitude of the modulated light Ec and Am is an amplitude of the marker signal Em, and ωc is angular velocity of the modulated light Ec and ωm is angular velocity of the marker signal Em. Moreover, T is time and K is a modulation rate.

Configurations and principles of the dispersion generator 3 will be described by referring to FIG. 2. FIG. 2(a) shows configurations of the dispersion generator and FIG. 2(b) is a graph showing its characteristics with the wavelength λ plotted as abscissa and the time delay Td plotted as ordinate. The dispersion generator 3 (see FIG. 1) is provided with a circulator 21 and a chirped fiber black grating (CFBG) 22. The circulator 21 is a device adapted to adjust the inputting and outputting of light signals at each aperture. For example, the adjustment is so made that, if it has three apertures including A, B and C, a light signal incident into the aperture A is outputted from the aperture B and a light signal incident into the aperture B is outputted from the aperture C. The CFBG 22 is a special light fiber in which portions having large or small refractive index are consecutively and repeatedly formed at a core section of an optical fiber at a fine interval in a diffraction grating form in the direction of the length. To the aperture B of the circulator 21 is connected the CFBG 22. Moreover, each of the fine intervals of the diffraction portion of the CFBG 22 is made larger as each of them becomes far from the aperture B.

Now, let it assumed that two light signals each having wavelengths λ1 and λ2 (λ1<λ2) respectively are inputted into the aperture A of the dispersion generator 3 having such configurations as described above. At this point, the two kinds of light each having the wavelength λ1 and λ2 respectively outputted from the aperture B to the CFBG 22 are reflected by the diffraction grating-like portion formed in the CFBG 22. Since each of the fine intervals of the diffraction grating-like portion becomes larger as it becomes far from the aperture B, the signal having the wavelength λ2 is returned to the aperture B with a longer delay compared with the signal having the wavelength λ1. FIG. 2(b) shows a relationship between the wavelength of the signal and the delay time. The graph shown in FIG. 2(b) shows a relationship in which the larger becomes the wavelength λ, the longer becomes the delay time Td.

Therefore, the light signal Eo with its amplitude modulated (by Formula 3), if it passes through the circulator 21, becomes the signal Ed with its wavelength dispersed as shown below.

$$Ed=Ac[1+K\cdot COS(\omega mT+\theta 1)]COS\ \omega cT \quad (4)$$

where, θ1 represents absolute phase caused by the delay time generated in CFBG 22, which is given by the following formula.

$$\theta 1=2\pi\cdot Td/\lambda 1 \quad (5)$$

where, the wavelength has been set to λ1 as a presumption. This formula shows that an envelop is delayed by an absolute phase θ1 caused by the delay time Td.

Next, operations of the stabilizing equipment according to the first embodiment will be described below by referring to FIG. 1.

The light signal Ed with the wavelength dispersed by the dispersion generator 3, which is represented by the formula (4), is transmitted to the photoelectric converter 4. The coupler B receives the wavelength-dispersed light signal Ed from the dispersion generator 3. It also receives the local oscillating light signal Ee having a wavelength being different from that of the modulated light Ec and then mixes these two kinds of signals. A photoelectric conversion is performed on the mixed light signals Ed+Ee by the light receiver 8 and a multiplication signal Es obtained by multiplying the local oscillating light signal Ee by the above wavelength-dispersed light signal Ed is produced. Ee is defined as follows.

$$Ee=Ae\cdot COS\ \omega eT \quad (6)$$

where, Ae represents an amplitude of the local oscillating light signal and ωe represents angular velocity of the local oscillating signal.

Next, principles on which the multiplication signal Es is produced from the mixed light signals Ed+Ee by the light receiver 8 will be described.

FIG. 3 is a diagram explaining operational principles of the photoelectric converter according to the present invention. As shown in FIG. 3, the light receiver 8 is a photodiode showing the non-linearity characteristic between the input light signal and the output electric signal. Generally, the input and output characteristic of the light receiver 8 is approximated by a secondary curve. When the mixed light signal Ed+Ee is inputted into the light receiver 8, an electric signal being in proportion to that of the mixed light signal $(Ed+Ee)^2$ (i.e., in proportional to the square of the mixed light signal) is obtained from its output port.

Presuming that if Ed<<Ee, the following formula is derived.

$$(Ed+Ee)^2 = Ed^2 + 2Ed\cdot Ee + Ee^2 \approx 2Ed\cdot Ee + Ee^2 \quad (7)$$

By substituting the formulas (4) and (6) into the formula (7) and using the description in FIG. 3, the following formula can be obtained.

$$(Ed+Ee)^2=(1/2)Ae^2(COS\ 2\omega eT+1)+Ae\cdot Ac[1+K\ COS(\omega mT+\theta 1)]$$
$$COS(\omega e+\omega c)T+Ae\cdot Ac[1+K\ COS(\omega mT+\theta 1)]COS(\omega e-\omega c)T \quad (8)$$

In a first term of the formula (8), the angular velocity of COS ωeT of the mixed light signal is so large that it cannot be covered by frequency characteristics of the light receiver 8 (FIG. 1) and therefore a direct current having an amplitude of (1/2) $Ae^2$ appears in the first term. Similarly, in second and third terms of the formula (8), the angular velocities of COS(ωe+ωc)T and COS(ωe−ωc)T are so large that they cannot be covered by the frequency characteristics of the light receiver 8 and therefore the envelope Ae·Ac[1+K COS($\omega$mT+$\theta$1) of the carrier_wave COS($\omega$e+$\omega$c)T and the envelope Ae·Ac[1+K COS($\omega$mT+$\theta$1) of the carrier wave COS($\omega$e−$\omega$c)T appear in the second and third terms. Accordingly, the output Es of the light receiver 8 (FIG. 1) is approximated by the following formula.

$$Es = \text{direct current component} + C \cdot \text{COS}(\omega mT + \theta 1) \quad (9)$$

where, C represents a constant which changes in proportional to the amplitude Ae·Ac of the envelope Ae·Ac[1+K COS($\omega$mT+$\theta$1).

As a result, by mixing the local oscillating light signal Ee having a large amplitude Ae with the wavelength-dispersed light signal Ed, the same effects can be obtained as in the case of the amplification of the actually wavelength-dispersed light signal Ed.

Then, the above output Es, represented by the formula (9), of the light receiver 8 is amplified by the amplifier 9 and transmitted to the phase difference detector P1. The output from the amplifier 9 is given by the following formula, in which the direct current components contained in the formula (9) have been cut.

$$Ea = D \cdot \text{COS}(\omega mT + \theta 1) \quad (10)$$

The band-pass filter BPF1 which has received the output Ea from the amplifier 9 is adapted to extract only sine waves of the above marker signal Em having an angular velocity $\omega$m. The electric signal which has passed through the band-pass filter BPF1 is a signal which is approximated by the above Ea is represented by the formula (10). The $\theta$1 represents a value of delay time occurring, at the dispersion generator 3, in the light signal in the light source board CH1 expressed by an absolute phase and a relation of $\theta 1 = 2\pi \cdot Td/\lambda 1$ have been found to hold.

The mixer MIX1 is adapted to mix the signal approximated by the output Ea=D·COS($\omega$mT+$\theta$1) given by the formula (10), which has received from the band-pass filter BPF1, with the marker signal Em=Am COS $\omega$mT (i.e. to multiply the former by the latter). As a result, the output from the mixer MIX1 contains two components COS (2$\omega$1T+$\theta$1) and COS $\theta$ as main components. To simplify the description, the output is normalized so that its amplitude is 1. The low-pass filter PF1 which has received the above two components is adapted to allow the signal having only the component COS $\theta$1 to pass. The signal having the component COS $\theta$1 is a signal with a level approximated by a direct current and its range of the level depends upon the delay time Td1 in the wavelength $\lambda$1 of the light signal from the light source board CH1.

The comparator R1 receives the signal having the level (COS $\theta$1) and compares the level of the signal with a predetermined reference voltage Vr1. The reference voltage Vr1 is set to a value of the level signal corresponding to the delay time Td1 (FIG. 2(*b*)), i.e., COS $\theta 1 = \text{COS}(2\pi \cdot Td1/\lambda 1)$. The comparator R1, if the level of the signal received by the comparator R1 is lower than the reference voltage Vr1 (i.e., at a point "a" in FIG. 2(*b*)), is adapted to send a control signal to the temperature controlling circuit TEC1 in order to decrease an oscillating frequency of the light source LD1 and to control so that the wavelength $\lambda$1 is increased by $\Delta\lambda$. As a result, the delay time Td1 is increased by $\Delta$Td and the value of the delay time moves to a point "c" as shown in FIG. 2(*b*). The comparator R1, if the level of the signal received by the comparator R1 is higher than the reference voltage Vr1 (i.e., at a point "b" in FIG. 2(*b*)), is adapted to send a control signal to the temperature controlling circuit TEC1 in order to decrease an oscillating frequency of the light source LD1 and to control so that the wavelength $\lambda$1 is decreased by $\Delta\lambda$. As a result, the delay time Td1 is decreased by $\Delta$Td and the value of the delay time moves to a point "c" as shown in FIG. 2(*b*). Thus, the wavelength of the light signal output from the light source LD1 of the light source board CH1 is automatically controlled by the wavelength $\lambda$1.

Under conditions of the light source board being CH1 (the wavelength $\lambda 1 = 1.55$ $\mu$m), the frequency of a superposed signal generating circuit being 100 MHz, the dispersion characteristic being about 1000 pSec/nm, an output variation of about 10 mV of the comparator R1 when the wavelength value $\lambda$1 is changed by 1 pm is obtained as an experimental value.

Similarily, by switching each light switch 1, the wavelength of each of the light sources (LD2 to LDn) is automatically controlled (to be $\lambda$2 to $\lambda$n). The above description is made for the case where the wavelength division multiplexing light source is used, however, the present invention is not limited to it. Even if n=1, the present invention is applicable as well. In the above description, the configurations provided with the circulator 21 (FIG. 2) and the CFBG 22 (FIG. 2) are used as the dispersion generator 3 (FIG. 1), however, the present invention is not limited to this configuration. That is, it is possible to construct the equipment by using a device having a wavelength dispersion characteristic, for example, a dispersion compensating fiber used for compensating the dispersion of the wavelength occurring in the optical communication network. Moreover, in the above description, the light receiver 8 (FIG. 1) is used which has input and output characteristics so called "square characteristics" in which an electric signal being changed in proportion to the square of an inputted signal amplitude is outputted. However, the present invention is not limited to the light receiver having the square characteristics, i.e., any device may be employed which is adapted to output a component having the amplitude value Ad·Ae obtained by multiplying the amplitude Ad of the above-described wavelength-dispersed light signal Ed by the above-described local oscillating amplitude Ae. In other words, according to the present invention, any device having cubic or biquadratic characteristics may be used.

As described above, according to the present invention, since the outputted wavelength ($\lambda$1 to $\lambda$n) is controlled based on the delay time produced by the dispersion generator 3, the wavelength of the light source of the light sources (LD1 to LDn) can be selected, not in a comb-teeth like and desultory manner, but consecutively and arbitrarily.

Also, according to the present invention, even if an error in the delay time occurs in the outputted wavelength of the light sources (LD1 to LDn) due to an accuracy error of each component, by individually adjusting the reference voltage to be applied to the comparators (R1 to Rn), the error can be reduced readily.

Also, since the Mach-Zehnder filter used in the conventional embodiment is not employed in the embodiment of the present invention, the control on temperatures is not required for dithering, resulting in the elimination of adverse effects caused by changes in temperatures on peripheral devices.

Also, since such expensive components as used in the conventional embodiments are not required in the present invention, falling costs of the equipment can be achieved.

Furthermore, since the amplitude of the light signal received by the light receiver is substantially amplified optically by the local oscillating light signal Ee, the accuracy in the control on the wavelength can be greatly improved.

Second Embodiment

Figure 4:
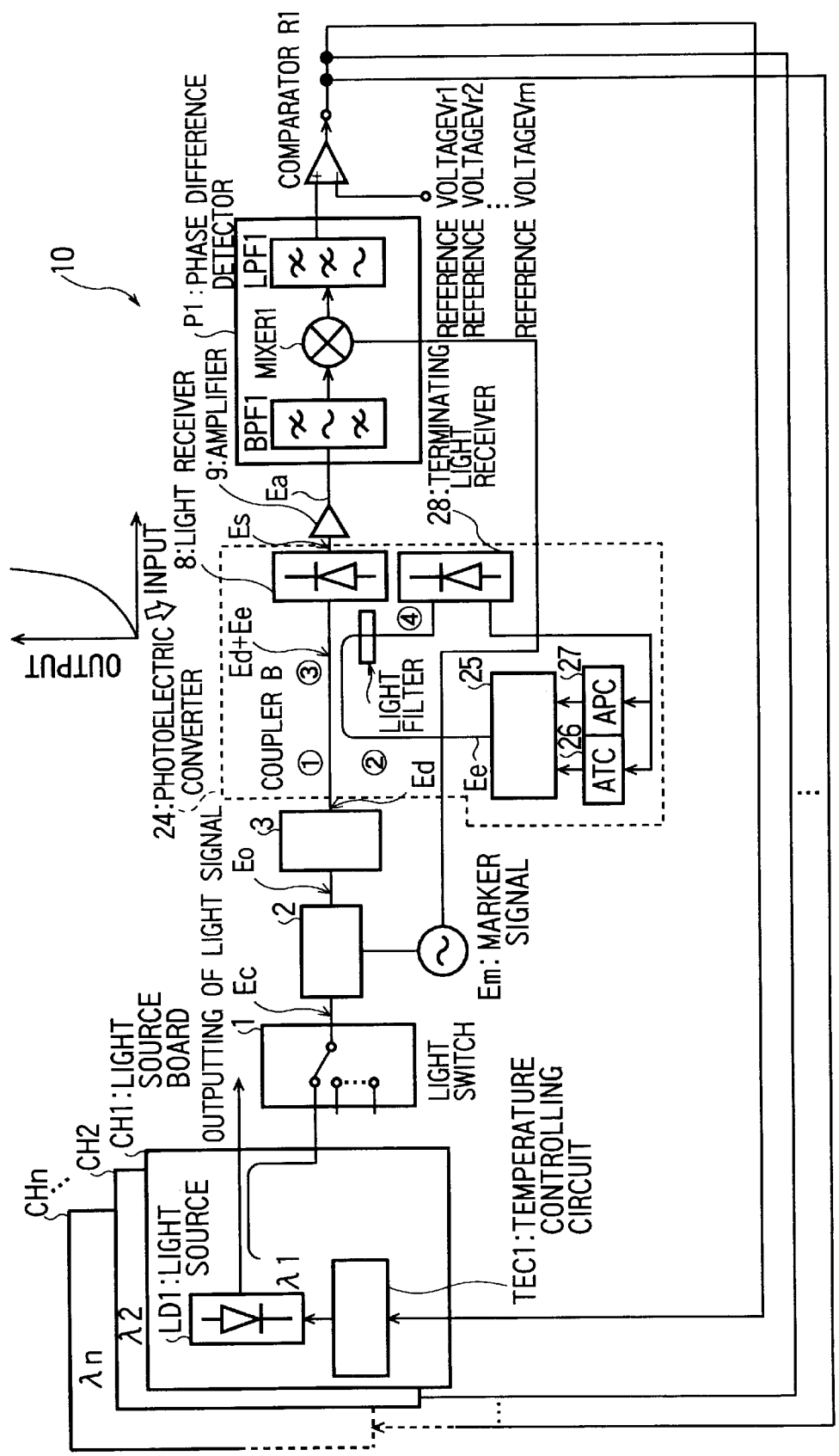
FIG. 4 is a schematic block diagram showing stabilizing equipment for a light source used in the WDM (Wavelength Division Multiplexing) optical communication according to a second embodiment of the present invention.

FIG. 4 is a schematic block diagram showing stabilizing equipment 10 for a light source device 11 used in the WDM (Wavelength Division Multiplexing) optical communication according to a second embodiment of the present invention.

A light source device 11 for a WDM optical communication of the present invention is comprised of n-pieces of light source boards CH1 to CHn, a light switch 1, an external modulator 2, a dispersion generator 3, a photoelectric converter 24, a phase difference detector P and a comparator R. Only configurations being different from those in the first embodiment are described below.

The photoelectric converter 24 is provided with a light receiver 8, a coupler B, a local oscillating light source 25, a temperature adjusting circuit 26, an output power adjusting circuit 27 and a terminating light receiver 28. The temperature adjusting circuit 26 and the output power adjusting circuit 27 are adapted to compensate changes caused by temperatures in the output from the local oscillating light source 25.

In the first embodiment, the laser diode is used as the local oscillating light source 5 (FIG. 1) to monitor the back-light of the photodiode. In the second embodiment, a light filter and a terminating light receiver 28 are mounted at the terminating point of the coupler B. The output light Ee is monitored by the light filter and the terminating light receiver 28 and its output voltage is fed back to the temperature adjusting circuit 26 and the output power adjusting circuit 27. Configurations and operations other than described above are the same as those in the first embodiment and their descriptions are omitted accordingly.

The following effects are produced by mounting the terminating light receiver 28 at the terminating point of the coupler B adapted to directly monitor the output light from the local oscillating light source 5 and to feed it back to the temperature adjusting circuit 26 and the output power adjusting circuit 27.

1. It is made possible to provide stable power without any effect caused by tracking error of the laser diode.
2. It is possible to greatly stabilize the wavelength of the light from the WDM light source.

Third Embodiment

Figure 5:
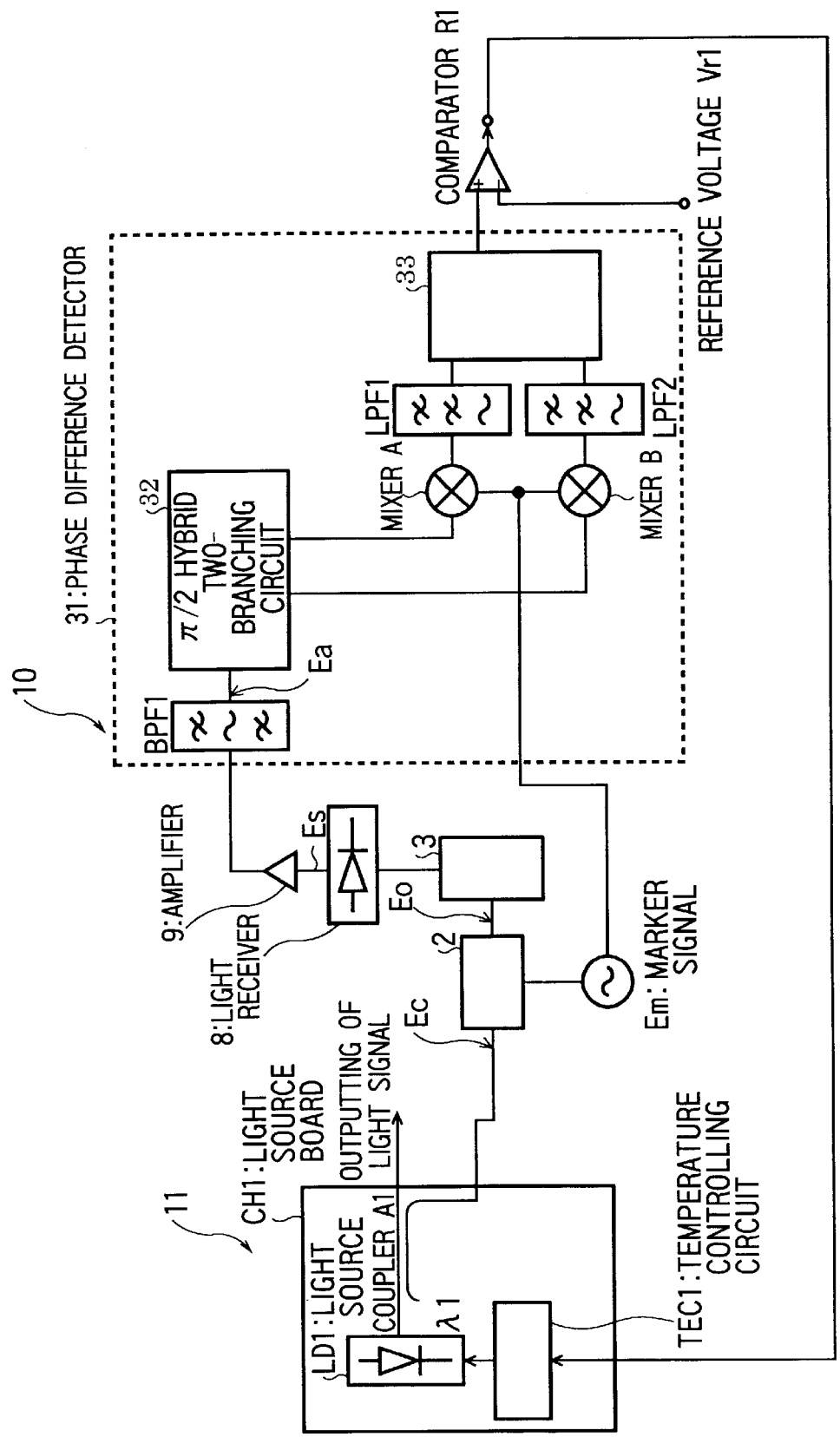
FIG. 5 is a schematic block diagram showing stabilizing equipment for a light source used in the WDM (Wavelength Division Multiplexing) optical communication according to a third embodiment of the present invention.

FIG. 5 is a schematic block diagram showing stabilizing equipment for a light source used in the WDM (Wavelength Division Multiplexing) optical communication according to a third embodiment of the present invention In the first embodiment, the amplitude of the output COS θ1 (though in the first embodiment, the output is normalized so that its amplitude is 1) which is outputted to the comparator R1 (FIG. 1) from the phase difference detector P1 (FIG. 1) changes in proportion to the amplitude D of the input signal Ea=D·COS($\omega$mT+θ1) (formula 10). In this state, if the amplitude D is changed due to temperature changes or the like, this change directly appears as changes in the amplitude of the output COS θ1. That is, since the output of the comparator R1 is changed due to changes in the amplitude at the external modulator 2 (FIG. 1), the dispersion generator 3 (FIG. 1) and the photoelectric converter 4 (FIG. 1), the changes in the amplitude interferes with stabilization of the wavelength of the light from the WDM light source. Therefore, in the third embodiment, in order to remove the shortcoming and to detect the phase difference only, the phase difference detector 31 is provided with a $\pi/2$ hybrid two-branching circuit and two mixers A and B, which enables the phase difference only to be detected without depending upon the amplitude of the input signal.

As shown in FIG. 5, stabilizing equipment 10 for a light source device 11 used in the WDM (Wavelength Division Multiplexing) optical communication is comprised of a light source board CH1, an external modulator 2, a light receiver 8, an amplifier 9, a phase difference detector 31 and a comparator R1. The light source board CH1 is a section constituting one channel used to produce a light signal. The light source board is provided with a light source LD1 and a coupler A1.

The light source LD1 is a laser diode to oscillate light with the wavelength $\lambda 1$, i.e., a section to output modulated light for optical communication. The temperature controlling circuit TEC1 is adapted to change the oscillating frequency of the light source LD1 in accordance with a control signal. The coupler A1 is used to separate a part of the modulated light Ec from the light source board CH1 and to take it out. The external modulator 2 is used to receive a part of the modulated light Ec of a channel formed by the light source board CH1 and to perform amplitude-modulation of the light by using a marker signal Em having a predetermined angular velocity set arbitrarily. The external modulator 2 is composed of, for example, a single crystal of lithium niobate or the like.

The dispersion generator 3 is adapted to receive the amplitude-modulated light signal Eo from the external modulator 2 and to perform wavelength-dispersion by using, for example, a fiber for compensating the dispersion, chirped fiber black gratings (CFBG) or the like.

The light receiver 8 is composed of a photodiode adapted to receive the wavelength-dispersed light signal Ed to be outputted from the dispersion generator 3 and to convert this light signal to electrical signals. The amplifier 9 is used to amplify the electrical signals converted by the light receiver. The phase difference detector 31 is a section to get a control signal used to stabilize the oscillating frequency of the above light source LD1. The phase difference detector 31 is provided with a band-pass filter BPF1, the $\pi/2$ hybrid two-branching circuit 32, the mixers A and B and an analog arithmetic unit 33.

The band-pass filter BPF1 is a filter adapted to allow a signal having a frequency band of the marker signal, i.e., a predetermined frequency band of COS $\omega$mT to pass therethrough.

The $\pi/2$ hybrid two-branching circuit 32 is a circuit adapted to receive a signal having the frequency band of the marker signal, i.e., an input having the band COS $\omega$mT to output two signals being different by $\pi/2$ in their phase from each other, one having a band of COS $\omega$mT and the other having a band of SIN $\omega$mT. The branching circuit is ordinarily composed of a coaxial cable and a strip line. The mixers A and B are multipliers used to multiply two signals.

The low-pass filters LPF1 and LPF2 are filters adapted to receive the output from the mixers A and B respectively and to output low frequency band components only.

The analog arithmetic unit 33 is a circuit adapted to receive outputs from the low-pass filters PLF1 and PLF2 and to perform a designated arithmetic operation. The arithmetic operation is later described in detail.

The comparator R1 is a section adapted to receive the output from the phase difference detector 31 and to compare it with the reference voltage Vr1 predetermined by the CH1. The result of the comparison is fed back to the temperature controlling circuit TEC1 as a control signal.

In the light source device 11, the light source LD1 of the light source board CH1 is adapted to oscillate the modulated light Ec having the wavelength $\lambda 1$. A part of the modulated light Ec is separated by the coupler A1 and then is transmitted to the external modulator. The external modulator 2 is used to perform amplitude modulation of the modulated light Ec by using the marker signal Em and then to feed the amplitude-modulated light signal Eo to the dispersion generator 3. The dispersion generator 3 is used to perform wavelength-dispersion of the amplitude-modulated light signal Eo.

The modulated light Ec and the marker signal Em are represented by the following formula.

$$Ec = Ac \cdot \cos \omega cT \quad (1)$$

$$Em = Am \cdot \cos \omega mT \quad (2)$$

Further, the modulated light signal Eo is expressed by the following formula when the formulas (1) and (2) are incorporated.

$$Eo = Ac(1 + K \cdot \cos \omega mT) \cos \omega cT \quad (3)$$

where, Ac represents the amplitude of the modulated light Ec, Am represents the amplitude of the marker signal Em, $\omega c$ represents the angular velocity of the modulated light Ec, $\omega m$ represents the angular velocity of the marker signal Em, T represents time and K represents the modulation rate.

The light signal Eo represented by the formula (3) is fed to the dispersion generator 3. Configurations and operational principles of the dispersion generator 3 of the third embodiment are the same as those disclosed in the first embodiment and their descriptions are omitted accordingly. The light signal Eo represented by the formula (3) is converted by the dispersion generator 3 to the signal Ed, the wavelength of which is dispersed, represented by the following formula.

$$Ed = Ac[1 + K \cdot \cos(\omega mT + \theta 1)] \cos \omega cT \quad (4)$$

where, $\theta 1$ represents an absolute phase caused by delay time occurring in the dispersion generator 3. That is, because the wavelength of light from the light source board is $\lambda 1$, $\theta 1$ is given by the following formula.

$$\theta 1 = 2\pi \cdot Td/\lambda 1 \quad (5)$$

This means that the envelop is delayed by the absolute phase $\theta 1$ caused by the delay time Td.

The light signal Ed, the wavelength of which is dispersed by the dispersion generator 3, represented by the formula (4) is fed to the light receiver 8. The angular velocity of COS $\omega cT$ is so large that it cannot be covered by the frequency characteristics of the light receiver 8 and therefore only the envelope $Ac[1 + K \cos(\omega mT + \theta 1)]$ of the carrier_wave appears.

Therefore, the output Es from the light receiver is approximated by the following formula.

$$Es = \text{direct current component} + C \cdot \cos(\omega mT + \theta 1) \quad (9)$$

where, C is a constant which changes in proportion to the amplitude Ae·Ac of the envelop $Ae \cdot Ac[1 + K \cdot \cos(\omega mT + \theta 1)]$.

The direct current component contained in this output Es is cut by the amplifier 9 and is amplified. The amplified light signal Es is passed through the band pass filter BPF1. The light signal Es that has passed through the band pass filter BPF1 is expressed by the following formula.

$$Ea = D \cdot \cos(\omega mT + \theta 1) \quad (10)$$

The Ea is fed to the $\pi/2$ hybrid two-branching circuit 32.

Figure 6:
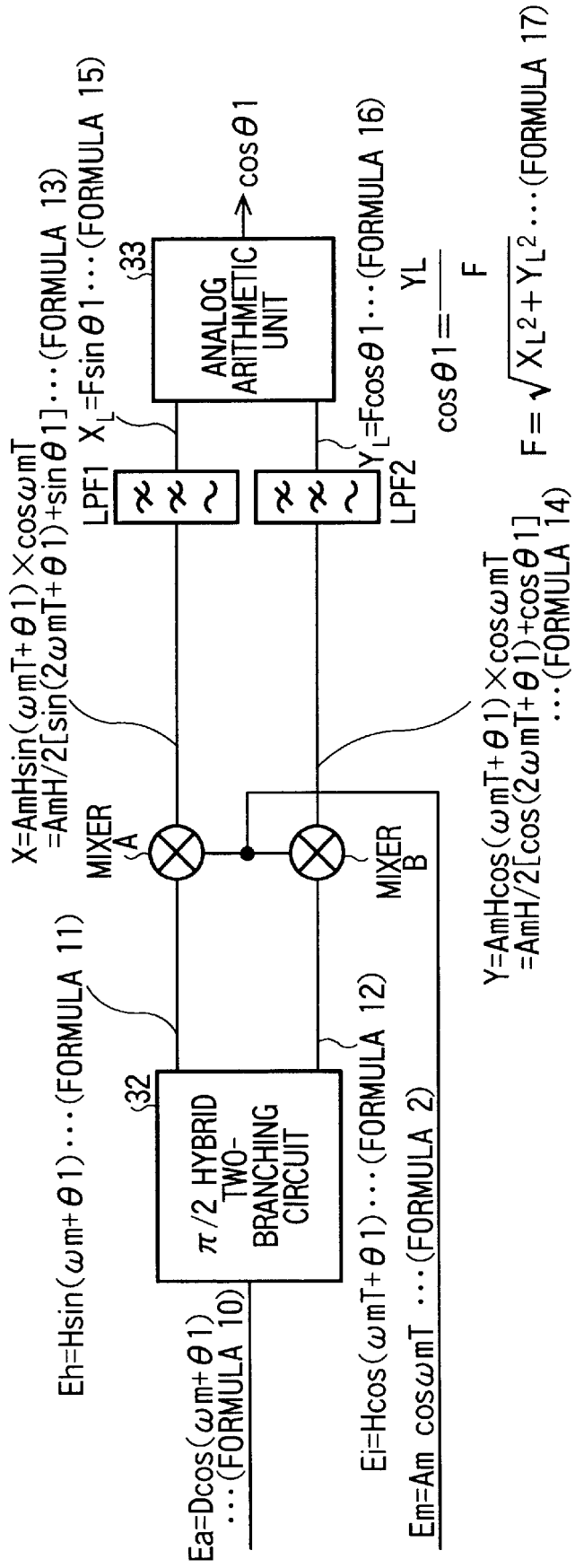
FIG. 6 is a diagram explaining principles of the third embodiment.

Next, operations of the phase difference detector 31 are described by referring to FIG. 6 which is a diagram explaining principles of the third embodiment. Flows of arithmetic operations performed by the $\pi/2$ hybrid two-branching circuit 32 to the analog arithmetic unit 33 are shown in FIG. 6. As shown in FIG. 6, the $\pi/2$ hybrid two-branching circuit 32 adapted to receive the signal Ea, which passed through the band pass filter BPF1, represented by the formula 10 outputs the following two signals being different by $\pi/2$ phase from each other $$Eh = H \cdot \sin(\omega mT + \theta 1) \quad (11)$$

$$Eh = H \cdot \cos(\omega mT + \theta 1) \quad (12)$$

The signal Eh represented by the formula (11) is multiplied by the marker signal Em represented by the formula (2) by the mixer A, to be converted as follows.

$$X = (Am \cdot H/2)[\sin(2\omega mT + \theta 1) + \sin \theta 1] \quad (13)$$

Similarly, the signal Ei represented by the formula (12) is multiplied by the above marker signal Em by the mixer B, to be converted as follows.

$$Y = (Am \cdot H/2)[\cos(2\omega mT + \theta 1) + \cos \theta 1] \quad (14)$$

The low-pass filter LPF1 adapted to receive the signal X represented by the formula (13) outputs low frequency components given by the following equation.

$$X_L = F \cdot \sin \theta 1 \quad (15)$$

Similarly, the low-pass filter LPF2 adapted to receive the signal Y represented by the formula (14) outputs low frequency components given by the following equation.

$$Y_L = F \cdot \cos \theta 1 \quad (16)$$

The analog arithmetic unit 33 is used to perform arithmetic operations of the following functional formula showing a relation between the signal $X_L$ represented by the formula (15) and the signal $Y_L$ represented by the formula (16).

$$F = (X_L^2 + Y_L^2)^{1/2} \quad (17)$$

The following result is calculated from the signal $Y_L$ represented by the formula (16) and the signal F represented by the formula (17).

$$Y_L/F = \cos \theta 1 \quad (18)$$

Points to be noted are as follows.

In the formula (18), all the amplitude constants, for example, Ac, Am, H, D or the like which are used to express signals transmitted from the light source board CH1 to the phase difference detector 31 are eliminated. Magnitude of the level signals is expressed by only COS $\theta 1$. This means that, even if there is a variation in the amplitude constant caused by temperature changes during the transmission of light from the light source board CH1 to the phase difference detector 31, only the phase difference component is outputted without effects on the measured level signal COS $\theta 1$ according to the formula (18).

Next, operations of the third embodiment will be described by referring to FIG. 5.

The comparator R1 is used to receive this level signal COS $\theta 1$ and compare it with the reference voltage Vr1. The reference voltage Vr1 is set to a value of the level signal corresponding to the delay time Td1 ((b) in FIG. 1) as described in the first embodiment, i.e., COS θ1=COS(2π·Td/λ1). If the level of the signal received by the comparator R1 is lower than the reference voltage Vr1 (point "a" of (b) in FIG. 2), the oscillating frequency of the light source LD1 is decreased by supplying a control signal to the temperature control circuit TEC1 so that the wavelength λ1 is increased by Δλ. As a result, the delay time Td1 is increased by ΔTd and the value moves to point "c". In contrast, if the level of the signal received by the comparator R1 is higher than the reference voltage Vr1 (point "b" of (b) in FIG. 2), the oscillating frequency of the light source LD1 is increased by supplying a control signal to the temperature control circuit TEC1 so that the wavelength λ1 is decreased by Δλ. As a result, the delay time Td1 is decreased by ΔTd and the value moves to point "c". As a result, the wavelength of the light signal output of the light source LD1 of the light source board CH1 is automatically controlled so as to be λ1.

The following effects are produced by mounting the phase difference detector 31.
1. Even if there is a variation in the amplitude constant caused by changes in temperatures during the transmission of the light signal from the light source board CH1 to the phase difference detector 31, the measured result is not affected by such changes.
2. As a result, since only changes in the phase difference can be detected, the WDM light source wavelength can be exactly controlled, thus more stabilizing the wavelength of the light source.

It is apparent that the present invention is not limited to the above embodiments but may be changed and modified without departing from the scope and spirit of the invention. For example, the equipment of the present invention may be so configured that a plurality of light sources CH1 to CHn is provided and that one channel out of n-pieces of channels by light switch is selected and the reference voltage to be applied to the comparator R1 is switched for every selected channel. Instead of the light receiver, the photoelectric converter may be used in any embodiment. The frequency stabilizing equipment may be used in not only the wavelength division multiplexing system but also in various optical communication system.

What is claimed is:
1. Frequency stabilizing equipment for optical communication light source comprising:
 a light source to output carrier light for optical communication, having a control circuit being able to adjust a frequency of said carrier light;
 a modulator to perform light strength modulation of said carrier light outputted from said light source by using a marker signal;
 a delay generator to provide time delay to said modulated carrier light depending on a wavelength of said modulated carrier light modulated by said modulator;
 a photoelectric converter to convert said modulated carrier light including said time delay provided by said delay generator to an electric signal;
 a phase difference detector to detect said time delay based on said electrical signal fed from said photoelectric converter;
 a control signal generating device to generate a control signal used for said control circuit based on a detected signal fed from said phase difference detector in order to achieve stabilization of a frequency of said carrier light from said light source; and
 whereby said photoelectric converter is comprised of a local oscillating light source in order to produce a local oscillating light signal having a wavelength being different from that of said carrier light, an optical coupling device to bind said local oscillating light signal fed from said local oscillating light source to said modulated carrier light from said delay generator in order to optically amplify said modulated carrier light from said delay generator and a light receiver having a non-linearity characteristic between an input signal and output signal, said light receiver receiving a light signal from said coupling device and outputting an electrical signal amplified non-linearly to said phase difference detector.

2. The frequency stabilizing equipment according to claim 1, wherein said local oscillating light source is given a feedback control to maintain a predetermined light intensity.

3. The frequency stabilizing equipment according to claim 1, wherein said optical coupling device is a coupler.

4. The frequency stabilizing equipment according to claim 1, wherein said delay generator is a dispersion generator.

5. The frequency stabilizing equipment according to claim 1, wherein said marker signal is a modulated signal having a predetermined angular velocity.

6. Frequency stabilizing equipment for optical communication light source comprising;
 a light source to output carrier light for optical communication, having a control circuit being able to adjust a frequency of said carrier light;
 a modulator to perform light strength modulation of said carrier light outputted from said light source by using a marker signal;
 a delay generator to provide time delay to said modulated carrier light depending on a wavelength of said modulated carrier light modulated by said modulator;
 a phase difference detector to detect time delay of said modulated carrier light provided by said delay generator;
 a control signal generating device to generate a control signal used for said control circuit based on a detected signal fed from said phase difference detector in order to achieve stabilization of a frequency of said carrier light from said light source; and
 whereby said phase difference detector is comprised of a branching circuit to divide an output signal fed from said delay generator into two output signals and to provide said two output signals a difference in phase of π/2 to each other, a pair of integrating circuits to multiply said output signals outputted from said branching circuit by said marker signal respectively, a pair of low-pass filters to take out low frequency components of electrical signals fed by said integrating circuits and an arithmetic unit to take out phase difference components between said marker signal and said modulated carrier light to be fed by said delay generator by means of dividing said low frequency components obtained from one of said pair of filters by said low frequency components obtained from the other of said pair of filters.

7. The frequency stabilizing equipment according to claim 6, wherein said arithmetic unit is used to calculate phase difference signals sin θ or cos θ by processing arithmetic operations using a formula:

$$F=(X_L^2+Y_L^2)^{1/2}$$

which is obtained from values of phase difference components $X_L$ and $Y_L$ and where an output signal from one of said filters is represented as $X_L = F \sin \theta_1$ and an output signal from the other of said filters is represented as $Y_L \cos \theta_1$.

8. The frequency stabilizing equipment according to claim 6, further comprising a photoelectric converter to convert said modulated carrier light fed by said delay generator into an electrical signal and to output said electrical signal to said phase difference detector, whereby said photoelectric converter is comprised of a local oscillating light source to produce a local oscillating signal having a wavelength being different from that of said carrier light, an optical coupling device to bind said local oscillating light signal fed from said local oscillating light source to said modulated carrier light from said delay generator in order to optically amplify said modulated carrier light from said delay generator and a light receiver having a non-linearity characteristic between an input signal and output signal, said light receiver receiving a light signal from said coupling device and outputting an electrical signal amplified non-linearly to said phase difference detector.

9. The frequency stabilizing equipment according to claim 8, wherein said local oscillating light source is given a feedback control to maintain a predetermined light intensity.

10. The frequency stabilizing equipment according to claim 8, said optical coupling device is a coupler.

11. The frequency stabilizing equipment according to claim 6, wherein said delay generator is a dispersion generator.

12. The frequency stabilizing equipment according to claim 6, wherein said marker signal is a modulated signal having a predetermined angular velocity.

* * * * *